United States Patent
Bradski et al.

(10) Patent No.: US 11,080,884 B2
(45) Date of Patent: Aug. 3, 2021

(54) POINT TRACKING USING A TRAINED NETWORK

(71) Applicant: Matterport, Inc., Sunnyvale, CA (US)

(72) Inventors: Gary Bradski, Palo Alto, CA (US); Gholamreza Amayeh, San Jose, CA (US); Mona Fathollahi, Sunnyvale, CA (US); Ethan Rublee, Mountain View, CA (US); Grace Vesom, Woodside, CA (US); William Nguyen, Mountain View, CA (US)

(73) Assignee: Matterport, Inc., Sunnyvale, CA (US)

(*) Notice: Subject to any disclaimer, the term of this patent is extended or adjusted under 35 U.S.C. 154(b) by 111 days.

(21) Appl. No.: 16/413,102

(22) Filed: May 15, 2019

(65) Prior Publication Data

US 2020/0364895 A1  Nov. 19, 2020

(51) Int. Cl.
G06K 9/00 (2006.01)
G06T 7/73 (2017.01)
G06T 7/593 (2017.01)
G06N 3/08 (2006.01)

(52) U.S. Cl.
CPC .......... G06T 7/73 (2017.01); G06N 3/08 (2013.01); G06T 7/593 (2017.01); G06T 2207/30204 (2013.01)

(58) Field of Classification Search
None
See application file for complete search history.

(56) References Cited

U.S. PATENT DOCUMENTS

| | | | | |
|---|---|---|---|---|
| 8,571,272 | B2* | 10/2013 | Gokturk | G06K 9/00288 382/118 |
| 9,560,345 | B2 | 1/2017 | Grundhofer | |
| 10,187,629 | B2 | 1/2019 | Cabral et al. | |
| 10,373,322 | B1* | 8/2019 | Buibas | G06K 9/00201 |
| 10,535,146 | B1* | 1/2020 | Buibas | G06Q 20/203 |
| 10,713,543 | B1* | 7/2020 | Skuin | G06N 20/00 |
| 2004/0233233 | A1* | 11/2004 | Salkind | G06T 7/20 715/719 |
| 2008/0201282 | A1* | 8/2008 | Garcia | G06N 3/0481 706/20 |

(Continued)

OTHER PUBLICATIONS

D. Farin, et al. Robust Camera Calibration for Sport Videos using Court Models, Proceedings of SPIE, 5307 80-91, 2004, 12 pages.

*Primary Examiner* — Shervin K Nakhjavan
(74) *Attorney, Agent, or Firm* — Ahmann Kloke LLP (57) ABSTRACT

A trained network for point tracking includes an input layer configured to receive an encoding of an image. The image is of a locale or object on which the network has been trained. The network also includes a set of internal weights which encode information associated with the locale or object, and a tracked point therein or thereon. The network also includes an output layer configured to provide an output based on the image as received at the input layer and the set of internal weights. The output layer includes a point tracking node that tracks the tracked point in the image. The point tracking node can track the point by generating coordinates for the tracked point in an input image of the locale or object. Methods of specifying and training the network using a three-dimensional model of the locale or object are also disclosed.

17 Claims, 6 Drawing Sheets

(56) References Cited

U.S. PATENT DOCUMENTS

| | | | |
|---|---|---|---|
| 2014/0330838 A1* | 11/2014 | Meier | G06F 16/9537 |
| | | | 707/743 |
| 2015/0288951 A1 | 10/2015 | Mallet et al. | |
| 2015/0341618 A1 | 11/2015 | He et al. | |
| 2016/0094840 A1 | 3/2016 | Warner | |
| 2016/0379041 A1* | 12/2016 | Rhee | G06K 9/6296 |
| | | | 382/118 |
| 2017/0163967 A1 | 6/2017 | Maier | |
| 2017/0262695 A1* | 9/2017 | Ahmed | G06K 9/6269 |
| 2017/0278289 A1* | 9/2017 | Marino | G06Q 30/0276 |
| 2017/0295358 A1 | 10/2017 | Cabral et al. | |
| 2018/0268256 A1* | 9/2018 | Di Febbo | G06K 9/6273 |
| 2018/0352150 A1* | 12/2018 | Purwar | H04N 5/23293 |
| 2019/0005069 A1* | 1/2019 | Filgueiras de Araujo | |
| | | | G06K 9/4671 |
| 2019/0012578 A1* | 1/2019 | Bhagavatula | G06T 17/00 |
| 2019/0108640 A1* | 4/2019 | Zhang | G06T 7/11 |
| 2019/0114804 A1* | 4/2019 | Sundaresan | G06K 9/66 |
| 2019/0208979 A1* | 7/2019 | Bassa | G06K 9/00664 |
| 2019/0286153 A1* | 9/2019 | Rankawat | G06T 7/11 |
| 2019/0304102 A1* | 10/2019 | Chen | G06K 9/6271 |
| 2019/0311494 A1* | 10/2019 | Ramalingam | G06K 9/00785 |
| 2019/0325183 A1* | 10/2019 | Tscherepanow | G06N 3/08 |
| 2019/0347806 A1* | 11/2019 | Vajapey | G06T 7/246 |
| 2020/0074224 A1* | 3/2020 | Hayashi | G06K 9/6263 |
| 2020/0082624 A1* | 3/2020 | Murphy-Chutorian | |
| | | | G06T 7/246 |
| 2020/0097724 A1* | 3/2020 | Chakravarty | G06K 9/00664 |
| 2020/0110966 A1* | 4/2020 | Revaud | G06T 5/005 |
| 2020/0117952 A1* | 4/2020 | Carroll | G06K 9/4628 |
| 2020/0126370 A1* | 4/2020 | Zalewski | G06Q 30/0633 |
| 2020/0193225 A1* | 6/2020 | Olmedareino | G06K 9/3241 |
| 2020/0258144 A1* | 8/2020 | Chaturvedi | G06Q 30/0257 |
| 2020/0356802 A1* | 11/2020 | Zhao | G06K 9/4671 |

\* cited by examiner

Training Data Synthesis with Occlusion Flag

Run Time Image with Valid Occlusion Flag

Run Time Image with Valid Self-Occlusion Flag

FIG. 5

FIG. 6 ated by the tag holds geometric information in that the corner points 101-
POINT TRACKING USING A TRAINED NETWORK

BACKGROUND

Fiducials elements are physical elements placed in the field of view of an imager for purposes of being used as a reference. Geometric information can be derived from images captured by the imager in which the fiducials are present. The fiducials can be attached to a rig around the imager itself such that they are always within the field of view of the imager or placed in a locale so that they are in the field of view of the imager when it is in certain positions within that locale. In the later case, multiple fiducials can be distributed throughout the locale so that fiducials can be within the field of view of the imager as its field of view is swept through the locale. The fiducials can be visible to the naked eye or designed to only be detected by a specialized sensor. Fiducial elements can be simple markings such as strips of tape or specialized markings with encoded information. Examples of fiducial tags with encoded information include AprilTags, QR Barcodes, Aztec, MaxiCode, Data Matrix and ArUco markers.

Fiducials can be used as references for robotic computer vision, image processing, and augmented reality applications. For example, once captured, the fiducials can serve as anchor points for allowing a computer vision system to glean additional information from a captured scene. In a specific example, available algorithms recognize an AprilTag in an image and can determine the pose and location of the tag from the image. If the tag has been "registered" with a locale such that the relative location of the tag in the locale is known a priori, then the derived information can be used to localize other elements in the locale or determine the pose and location of the imager that captured the image. The process of keeping track of these anchor points and identifying them in any image captured in a given locale or of a given object is referred to herein as "point tracking" and the anchor points are referred to as "tracked points."

Figure 1:
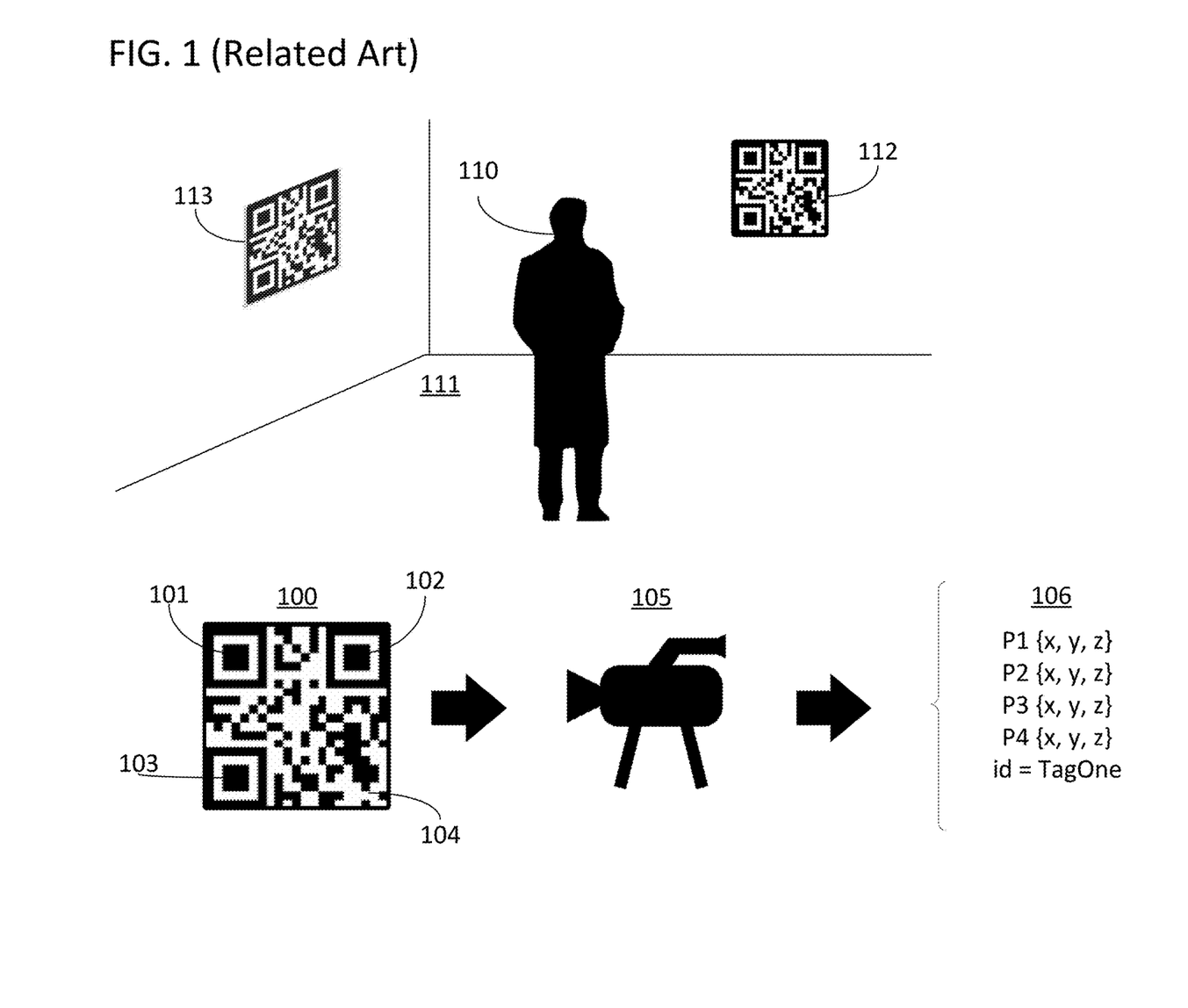
FIG. 1 is an illustration of a locale with fiducial elements in accordance with the related art.

FIG. 1 shows a fiducial element 100 in detail. The tag holds geometric information in that the corner points 101-104 of the surrounding black square can be identified. Based on prior knowledge of the size of the tag, a computer vision system can take in an image of the tag from a given perspective, and the perspective can be derived therefrom. For example, a visible light camera 105 could capture an image of fiducial element 100 and determine a set of values 106 that include the relative position of four points corresponding to corner points 101-104. From these four points, a computer vision system could determine the perspective angle and distance between camera 105 and tag 100. If the position of tag 100 in a locale were registered, then the position of camera 105 in the locale could also be derived using values 106. Furthermore, the tag holds identity information in that the pattern of white and black squares serves as a two-dimensional bar code in which an identification of the tag, or other information, can be stored. Returning to the example of FIG. 1, the values 106 could include a registered identification "TagOne" for tag 100. As such, multiple registered tags distributed through a locale can allow a computer vision processing system to identify individual tags and determine the position of an imager in the locale even if some of the tags are temporarily occluded or are otherwise out of the field of view of the imager.

FIG. 1 further includes a subject 110 in a set 111. As illustrated, fiducial elements 112 and 113 have been placed in set 111 to serve as references for facilitating the kinds of image processing techniques mentioned above, including point tracking. However, as the tags have been captured along with the scene, they will need to be removed via post processing before the scene is in final form. Furthermore, if set 111 is being used for a live performance, the presence of the tags could appear unprofessional and be distracting for the audience. The tags also need to be physically attached to some structure in the set, making it difficult to extract information regarding points that are floating in space in the middle of the set. Furthermore, the tags may be temporarily occluded from the view of imager 115 as subject 110 moves through the set such that the system will temporarily be unable to track the points associated with the occluded tag.

SUMMARY

This disclosure includes systems and methods for tracking points in a locale or on an object. The system can include a trained network. The network can be a directed graph function approximator with adjustable internal variables that affect the output generated from a given input. The network can be a deep net. The adjustable internal variables can be adjusted using back-propagation. The adjustable internal variables can also be adjusted using a supervised, semi-supervised, or unsupervised learning training routine. The adjustable internal variables can be adjusted using a supervised learning training routine comprising a large volume of training data in the form of paired training inputs and associated supervisors. The pairs of training inputs and associated supervisors can also be referred to as tagged training inputs. The networks can be artificial neural networks (ANNs) such as convolutional neural networks (CNNs). The directed graph can take in an input in the form of an image of the locale or object and generate an output in the form of a location for a tracked point. The location can be provided with reference to the image. The disclosed methods including methods for training such directed graphs.

Locales in which the points can be tracked include a set, playing field, race track, stage, or any other locale in which an imager will operate to capture data in which points need to be tracked. The locale can include a subject to be captured by the imager along with the fiducial elements. The locale can host a scene that will play out in the locale and be captured by the imager along with the fiducial elements. The disclosed systems and methods can also be used to track points on a subject for an imager serving to follow that subject. For example, the tracked point could be on the clothes of a human subject, attached to the surface of a vehicular subject, or otherwise attached to a mobile or stationary subject.

In specific embodiments, the directed graphs can be specified and/or trained using three-dimensional models of at least a portion of the locale or object. The three-dimensional models can be generated and registered using a set of fiducial elements in the locale or on the object. For example, a camera can be swept through a locale or around an object and its pose can be simultaneously obtained via an internal inertial movement unit (IMU), or other location tracker, or via pose information derived from fiducial elements located in the images obtained by the camera. The captured pose and imagery information can be used via photogrammetry to compute a three-dimensional model in the form of a mesh and texture of the locale or object. The fiducial elements can be any of the fiducial elements disclosed in U.S. patent application Ser. No. 16/412,784, filed concurrently herewith, which is incorporated by reference here in its entirety for all purposes. The three-dimensional model can be produced and registered using any of the approaches disclosed in U.S. patent application Ser. No. 16/412,825, filed concurrently herewith, which is incorporated by reference herein in its entirety for all purposes.

As mentioned, in specific embodiments of the invention, the network can be specified using a three-dimensional model. The three-dimensional model can be used to specify points that will be tracked by the network. For example, a user could be presented with a coordinate system for a locale or object and enter the three-dimensional coordinates of the tracking point in that coordinate system. The specified points could then be associated with an output node of the network such that the network would provide coordinates of the tracked point on that output node in response to an image supplied to the input of the network. The specified point could also be associated with an output node of the network such that the node will provide a probability that a predefined portion of the image is the tracked point in response to an image supplied to the input of the network.

As mentioned, in specific embodiments of the invention, the network can be specified using a three-dimensional model that is registered by a fiducial element. As a more specific example, the three-dimensional model could be used to select a point in three-dimensional space that is offset from a fiducial in the scene. In this case, the three-dimensional model of the portion of the locale could be limited to the plane occupied by the fiducial as viewed from any given perspective in the scene with the location of the tracked point being specified with reference to that plane.

As mentioned, in specific embodiments of the invention, the three-dimensional model can be used for training the network. The three-dimensional model can be used for one or both of: (ii) synthesizing a training image; and (iii) synthesizing a supervisor tracking point location in a training image. The three-dimensional model can be used to synthesize a training image in that a random camera pose could be selected from within the model and a view of the three-dimensional model from that pose could be rendered to serve as the training image. The model could be a six degrees-of-freedom (6-DOF) model for this purpose. A 6-DOF model is one that allows for the generation of images of the physical space with 6-DOF camera pose flexibility, meaning images of the physical space can be generated from a perspective set by any coordinate in three-dimensional space: (x, y, z), and any camera orientation set by three factors that determine the orientation of the camera: pan, tilt, and yaw. The three-dimensional model can also be used to synthesize a supervisor tracking point location. The supervisor tracking point location can be the coordinates of a tracking point in a given image. The coordinates could be x and y coordinates of the pixels in a two-dimensional image. In specific embodiments, the training image and the tracking point location will both be generated by the three-dimensional model such that the synthesized coordinates are coordinates in the synthesized image.

In specific embodiments of the invention, a computer-implemented method for training a network for point tracking is provided. The method comprises generating a three-dimensional model of at least a portion of a locale, receiving a selection of a tracking point with reference to the three-dimensional model and defining an output node in an output layer of the network as a first point tracking node associated with the tracking point. The method also comprises applying to an input layer of the network an encoding of a training image of the locale with a supervisor tracking point location on the training image. The supervisor tracking point location being the location of the tracking point on the training image. The method also comprises generating, in response to the applying of the training image, a tracking point inference at the output node of the network using a set of internal weights of the network, and updating the set of internal weights based on a delta between the tracking point inference and the supervisor tracking point location.

In specific embodiments of the invention, a trained network for point tracking is provided. The network can be stored in a non-transitory computer readable medium. The network comprises an input layer configured to receive an encoding of an image of a locale or an object, a set of internal weights which encode information associated with: (i) the locale; and (ii) a tracked point in the locale or on the object, an output layer having a set of output nodes and configured to provide an output based on: (i) the image as received at the input layer; and (ii) the set of internal weights, and a first point tracking node in the output layer that tracks the tracked point in the image.

DETAILED DESCRIPTION

Specific methods and systems associated with networks for point tracking in accordance with the summary above are provided in this section. The methods and systems disclosed in this section are non-limiting embodiments of the invention, are provided for explanatory purposes only, and should not be used to constrict the full scope of the invention.

Figure 2:
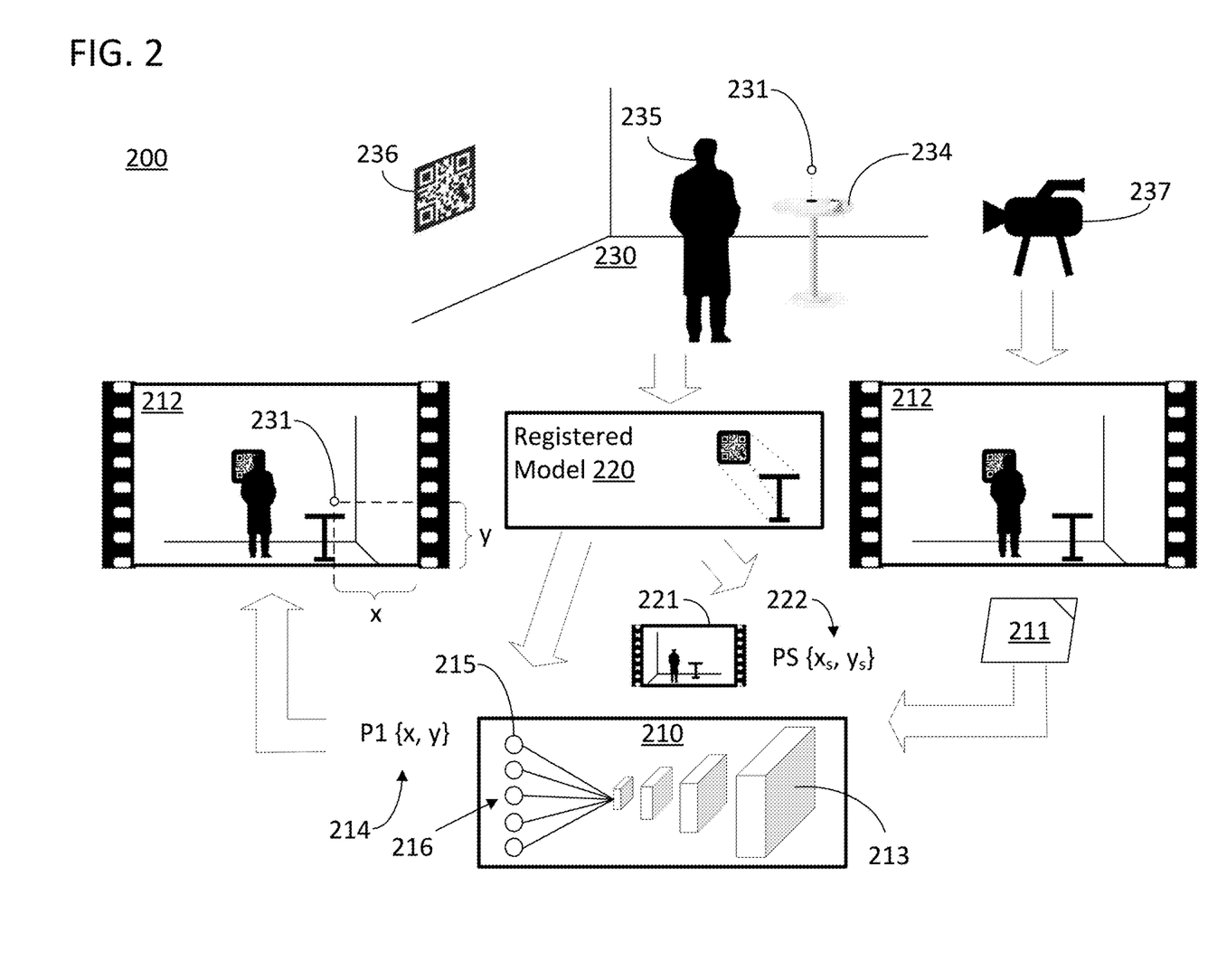
FIG. 2 is a data flow diagram illustrating the operation of a network for point tracking, and a three-dimensional model being used to specify and train that network in accordance with specific embodiments of the invention disclosed herein.

FIG. 2 provides a data flow diagram 200 to illustrate specific embodiments of the invention. FIG. 2 includes network 210 which has been trained using model 220 to track a tracked point 231 in any image of locale 230. The example provided includes tracked point 231 which is floating in three-dimensional space above table 234. In accordance with some of the approaches disclosed herein, network 210 can be designed to track tracked point 231 regardless of whether subject 235 occludes fiducial element 236 or tracked point 231 from the view of imager 237. Indeed, network 210 can be designed to track tracked point 231 without any fiducial elements located in locale 230 at all. As illustrated, network 210 can take in an encoding 211 of an image 212 of locale 230 as captured by imager 207 at an input layer 213. The network 210 can then, in response, output coordinates 214 of tracked point 231 from an output node 215 in an output layer 216 of the network 210. The coordinates 214 of tracked point 231 can be provided with reference to the coordinate system of image 212 as shown. Alternatively, the output layer can include a set of nodes associated with predefined portions of the input image that each output a probability that any of those predefined portions is the tracked point. As will be described, the network can conduct this action regardless of whether fiducial element 236 has been occluded, or is present at all, and regardless of whether tracked point 231 itself has been occluded. Tracked point 231 is illustrated as being floating in three-dimensional space to highlight the flexibility of the disclosed approach, but the tracked point can also be located on a surface within the locale or defined with respect to subject 235 instead of with respect to locale 230.

FIG. 2 also includes an illustration of the use of three-dimensional model 220 to specify and train network 210. Specifically, the three-dimensional model 220 is a registered model of locale 230 that has been registered through use of fiducial elements such as 236. As described in U.S. patent application Ser. No. 16/412,784, table 234 may also have been registered as a fiducial element for use in turn for registering three-dimensional model 220. The model is used to specify tracking point 231 by associating it with output node 215 in output layer 216 of network 210. The model can be used in this regard by presenting a set of potential click points to a user in a rendered perspective view of locale 230 which is generated through the use of model 220. After the click point has been selected by a user, the system can associate output node 215 with tracking point 231, thus changing output node 215 to an output tracking node. Depending on the embodiment, the node can then provide the coordinates of the tracked point or a probability that a predefined portion of the image is the tacked point. In the illustrated case, the second portion of the network is a set of fully connected layers such that a set of coordinates would be produced. In an implementation in which a probability per location was produced the second portion of the network would appear as a set of decoder layers as are known in the art.

Three-dimensional model 220 can also be used to synthesize training data for network 210. The three-dimensional model 220 can be used to synthesize a training image 221 and synthesize a supervisor tracking point 222. The training image 204 and supervisor tracking point 222 can then be used in a training routing to adjust the internal weights of network 210. The supervisor tracking point 222 can be synthesized to correspond to the location of tracked point 231 in the training image 221. As such, synthesized supervisor tracking points are synthesized after the tracked point has been specified. In the training routine, training image 221 can be provided to the input of network 210, the resulting output of the network generated by output tracking node 215 can be compared to supervisor tracking point 222, and a delta between the two can be used to update the internal weights of the network.

Those of ordinary skill in the art will recognize that a large volume of training data should be generated in order to ultimately train network 210 to identify tracking points in arbitrary images taken from locale 230. The three-dimensional model can be used to synthesize a large volume of data as the process for generating the data will be conducted purely in the digital realm. The model can be used to generate both elements of the training data. However, as stated in the summary, the three-dimensional model may only be used for one of these tasks, and each task individually can be conducted without the use of a three-dimensional model.

In specific embodiments of the invention, the network will track multiple tracking points simultaneously. In particular, in specific embodiments it is beneficial to maximize the number of tracking points in the scene while still being able to track the points in real time. As such the available amount of computer resources (e.g., compute and memory) can be measured and used to set the number of key points that will be tracked to fulfill this goal. In current implementations with high end computers and imagers a fair number of points is 500. These tracking points can then be distributed out over a given locale. The distribution can be conducted to evenly space the points out across the locale or on the object. The distribution of tracked points allow for good coverage regardless of the point of view of an imager in the locale or relative to the object meaning that the computer vision and augmented reality applications mentioned in the background will have a sufficient number of points to operate regardless of camera pose at run time. Furthermore, as will be described below, the points can be used for real time continuous camera calibration at run time.

In specific embodiments of the invention, the networks used, such as network 210, include a set of internal weights. The set of internal weights can encode information associated with a locale or object, and a tracked point in the locale or on the object. The encoding can be developed through a training procedure which adjusts the set of internal weights based on information regarding the locale or object, and the tracked point. The internal weights can encode information associated with the object in isolation or information associated with the object as it appears in the locale. In specific embodiments of the invention, fiducial elements will be deliberately scrubbed from the training data used to train the network such that the internal weights will not encode any information regarding fiducial elements in the locale or on the object. In embodiments in which a three-dimensional model, such as three-dimensional model 220, are used to generate training data for the network, the network can encode information associated with the locale because it encodes information associated with the three-dimensional model of the locale. The internal weights can be adjusted using any training routine used in standard machine learning applications including back propagation with stochastic gradient descent. The internal weights can include the weights of multiple layers of fully connected layers in an ANN. If the network is a CNN or includes convolutional layers, the internal weights can include filter values for filters used in convolutions on input data or accumulated values internal to an execution of the network.

In specific embodiments of the invention, the networks used, such as network 210, include an input layer that is configured to receive an encoding of an image of a locale or object. Those of ordinary skill in the art will recognize that a network configured to receive an encoding of image can generally receive any image of the same format regardless of the content. However, a specific network will generally be trained to receive images with a specific class of content in order to be effective.

The image the network is configured to receive will depend on the imager used to capture the image, or the manner in which the image was synthesized. The imager used to capture the image can be a single visible light camera, a stereo rig designed to capture depth information and visible light information, a specialized depth sensor, or an ultraviolet or infrared sensor and optional projector. The imager can also include a main camera, such as a high-end hero camera, and one or more auxiliary cameras, such as witness cameras. The imager can also include an inertial motion unit (IMU), gyroscope, or other position tracker for purposes of capturing this information along with the images. Furthermore, certain approaches such as simultaneous localization and mapping (SLAM) can be used by the imager to localize itself as it captures the images. The image can be a visible light image, an infrared or ultraviolet image, a depth image, or any other image containing information regarding the contours and or texture of a locale or object. The images can accordingly by two-dimensional visible light texture maps, 2.5-dimensional texture maps with depth values, or full three-dimensional point cloud images of the scene or object. The images can also be pure depth maps without texture information, surface maps, normal maps, or any other kind of image based on the application and the type of imager applied to capture the images.

The encodings of the images can take on various formats depending on the image they encode. The encodings will generally be matrixes of pixel or voxel values. The encoding of the images can include at least one two-dimensional matrix of pixel values. The spectral information included in each image can accordingly be accounted for by adding additional dimensions or increasing said dimensions in an encoding. For example, the encoding could be an RGB-D encoding in which each pixel of the image includes an individual value for the three colors that comprise the texture content of the image and an additional value for the depth content of the pixel relative to the imager. The encodings can also include position information to describe the relative location and pose of the imager relative to the locale or subject at the time the image was captured.

The input layer can be configured to receive an encoding in the sense that the network will be able to process the input and deliver an output in response thereto. The input layer can be configured to receive the encoding in the sense that the first layer of operations conducted by the network can be mathematical operations with input variables of a number equivalent to the number of variables that encode the encodings. For example, the first layer of operations could be a filter multiply operation with a 5-element by 5-element matrix of integer values with a stride of 5, four lateral strides, and four vertical strides. In this case, the input layer would be configured to receive a 20-pixel by 20-pixel grey scale encoding of an image. However, this is a simplified example and those of ordinary skill in the art will recognize that the first layer of operations in a network, such as a deep-CNN, can be far more complex and deal with much larger data structures. Furthermore, a single encoding may be broken into segments that are individually delivered to the first layer via a pre-processing step. Additional pre-processing may be conducted on the encoding before it is applied to the first layer such as converting the element data structures from floating point to integer values etc.

In specific embodiments of the invention, the networks used, such as network 210, include an output layer with at least one output node. The network can be initialized to have a general configuration for use in combination with the approaches disclosed herein, but this configuration can be augmented based on specifications received for a particular deployment. For example, as mentioned previously, a user could be provided with the ability to specify a tracking point to be associated with the output node such that the output node would become a point tracking node. The point tracking node could track the position of a tracked point in any image delivered to the network by identifying a pixel or voxel location in an encoding of the pixel values of an image. The output layer could conduct mathematical operations such as matrix multiplications or convolutions on values internal to the network in order to generate values for the coordinates of the tracked point. The values could be two-dimensional or three-dimensional coordinate values depending upon the application.

The number of output nodes in the output layer could also be increased or decreased by the user to set the number of tracking points equal to the number of tracked points that a user wanted to track in the scene. For example, the output layer could include a second point tracking node, and the set of internal weights of the network could encode information associated with the second tracked point in the locale or on the object. The second point tracking node could then track a second tracked point in the image. The size of the network could be automatically expanded or contracted in the background to accommodate the user's selection as to the number of tracked points.

The output nodes could be configured to provide an output based on an image as received at the input layer and the set of internal weights of the network. For example, the output node could be linked to a set of nodes in a hidden layer of the network, and conducted a mathematical operation on the values delivered from those nodes in combination with a subset of the internal weights in order to generate two values for the x and y coordinates of the tracked point in an image delivered to the network, or a probability that a predetermined location in the image is the tracked point. The format of the output produced by a point tracking node can vary depending upon the application. For example, if the tracked point is being identified in a three-dimensional image, the output could be three dimensional coordinates of the voxel associated with the tracked point in the three-dimensional image. Furthermore, as will be explained with reference to FIG. 4 below, a point tracking node could include an occlusion flag to indicate that a tracking point was occluded in an image. In the case of a tracked point located on an object, the output could also or alternatively include a self-occluding flag to indicate if the tracking point is occluded in the image by the object itself. The flag could be a bit in a specific location with a state specifically associated with occlusion such that a "1" value indicated occlusion and a "0" value indicated no occlusion. In these embodiments, the output could also include a coordinate value for the location in the image associated with the tracked point even if it is occluded. The coordinate value could describe where in the image the tracked point would appear if not for the occlusion. Occlusion indicators can provide important information to alternative image processing systems since those systems will be alerted to the fact that a visual search of the image will not find the tracked point. In other embodiments, the output could be a set of output nodes associated with locations on the input image and the values output could be an identity of a fiducial element at a specific location, a probability that a fiducial element is at a specific location, an indication that a fiducial is occluded at a specific location, an indication that a fiducial is self-occluded at a specific location, and various combinations thereof.

Figure 3:
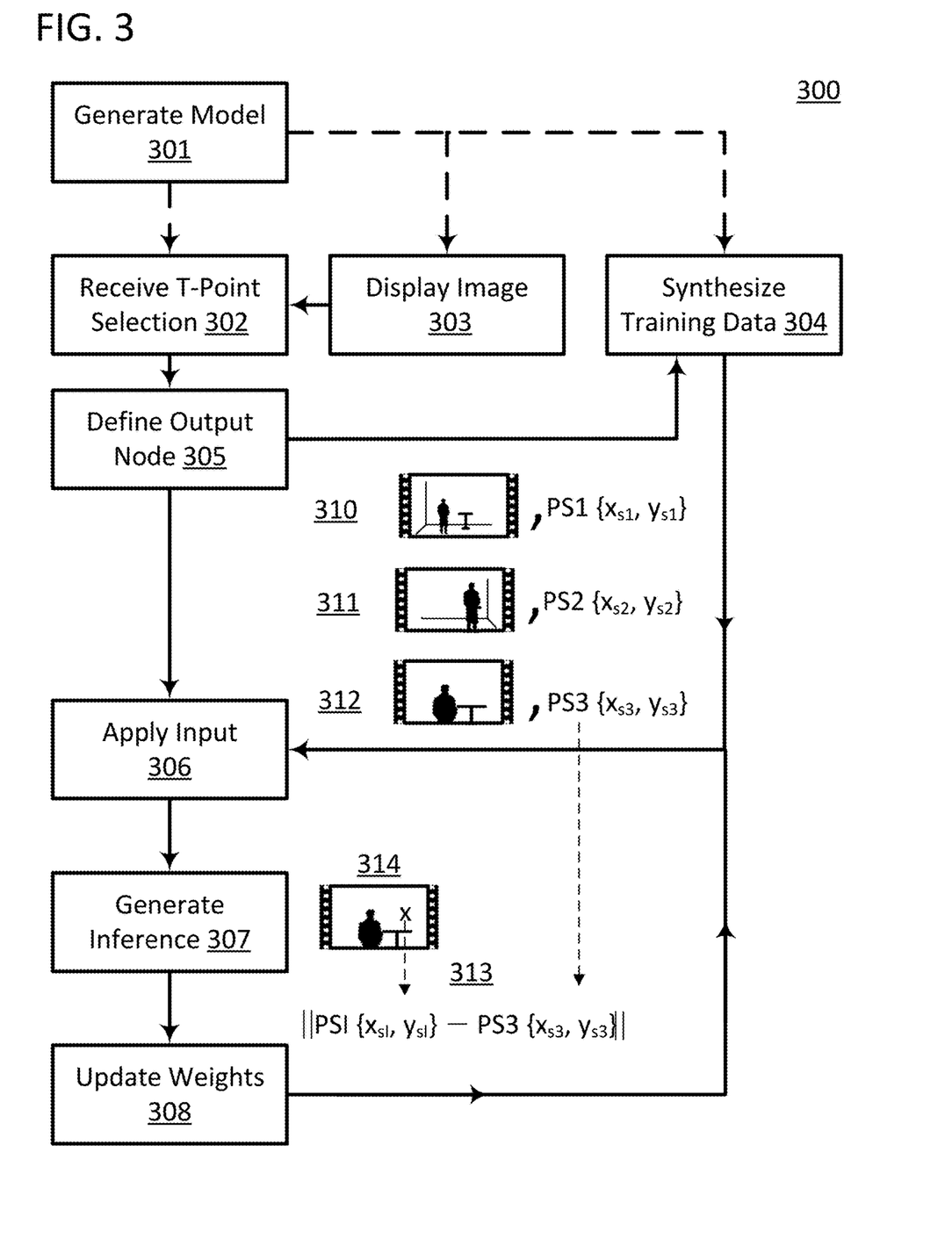
FIG. 3 is a flow chart for a set of methods for specifying and training a network for point tracking in accordance with specific embodiments of the invention disclosed herein.

FIG. 3 provides a flow chart 300 for a set of methods to illustrate specific embodiments of the invention. The various method steps can each be executed by a computer and instructions for their execution can be stored on one or more non-transitory computer-readable medium. The various methods illustrated by the flow chart share the same core steps, but each step can be executed in various ways depending upon the type of model utilized, whether or not the model is used to select a tracking point, and whether or not the model is used to synthesizing training data. Each step will be discussed in series while describing multiple different methods that are in many cases mutually exclusive depending upon these factors. The model can be a full three-dimensional geometric model including both depth and texture information for a locale or object. The model an also just be a model of a portion of the locale or scene. For example, the model could just describe the location and pose of a registered surface in the scene. As another example, the model could just describe the location and pose of a set of registered surfaces in the scene and their positions relative to each other. In specific embodiments, the model will be captured and registered using fiducial elements. For example, the model could be a model of the relative positions of a set of two-dimensional encoded tags placed in the scene along with a description of the orientation of each tag in the set. Different models can serve different purposes, for example a model of the entire scene with texture information and with 6-DOF flexibility can be useful for generating synthesized training images from a random imager pose location in the scene or relative to the object. As another example, a model of a single surface in the scene in the form of a temporary fiducial element could be useful for training a network to identify a single point floating in the center of the locale relative to the fiducial element.

Flow chart 300 begins with a step 301 of generating a three-dimensional model of at least a portion of a locale. The model can be a model of the entire locale or object. For example, the model could be a full three-dimensional texture map of a set with 6-DOF flexibility. The model can be a model of the fiducial elements in the locale or on the object. For example, the model could be a three-dimensional description of the relative poses and positions of a set of AprilTags located in the locale. The model can be a model of specific scene planes, or other surfaces, in the locale or on the object. For example, the model could be a three-dimensional description of the surface of a table located in the locale. The scene planes can be registered and captured with reference to fiducial elements that are placed on the surface. For example, an AprilTag could be temporarily placed on a table in order to register and capture a description of the orientation of the table's surface in three-dimensional space. With additional computation and data gathering, the entire locale or object can be captured with reference to fiducial elements that are place on the object or around the locale. The fiducial elements can be temporary fiducial elements that are included in the scene for purposes of generating the model and can be removed later such as when a live performance will be performed in the locale. The fiducial elements can also be fiducial elements that were previously registered with the locale or object as described in U.S. patent application Ser. No. 16/412,784. The fiducial elements can also be any of the virtual fiducial elements described in U.S. patent application Ser. No. 16/412,825.

In specific embodiments, step 301 can be conducted with an imager that captures the scene with or without a set of fiducial elements located in the scene already. The three-dimensional model can thereby be registered in that if the position of the fiducial element is detected ex ante by an imager, a correlation can be established between locations in the image and the three-dimensional model. In a basic example, the capture could include a single still image of the locale or object taken from a known pose. In more complex examples, the capture could involve the sweep of an imager through a location and the concurrent derivation or capture of the location and pose of the imager as the capture progresses. The pose and location of the imager can be derived using an internal locator, such as an IMU, or using image processing techniques such as self-locating with reference to natural features of the locale or with reference to pose information provided from fiducial elements in the scene. The imager can be a three-dimensional camera, a two-dimensional visible light camera, or a stereo rig of two-dimensional imagers configured to capture depth information. The pose and imagery captured by the imagers can be combined via photogrammetry to compute a three-dimensional texture mesh of the locale or object. Alternatively, the position of fiducial elements in the scene could be known a priori and knowledge of their relative locations could be used to determine the location and pose of other elements in the scene.

In alternative embodiments, step 301 could be conducted fully in the digital realm, and the physical space for the locale or the object could be generated in response to the three-dimensional model. For example, a director or graphic designer could specify a locale or object in a computer, and a physical space could then be laid out by a set designer to match the model precisely. In the case of an object, a three-dimensional printer could form the object from the three-dimensional model for similar purposes.

Regardless of the approach used, the execution of step 301 can conclude with the availability of a three-dimensional model of a locale or object for which point tracking is desired. The model can then be used for one or more of: displaying an image of the local as in step 302, receiving a tracking point selection as in step 303, or synthesizing training data as in step 304. All three steps can be conducted using the model. However, each can be conducted without it, and different models can be used for each step.

Step 303 can involve rendering a selection image on a display. The step can be conducted using the model, particularly when the model is a 6-DOF three-dimensional model as the user may be able to translate the image and navigate to a desired portion of the locale or object before making a selection. The selection can be provided by a user via a standard user interface tool such as a mouse, touch screen display, voice command, or other interface. The image can be rendered in a perspective view to allow a user to select a specific point in three-dimensional space. The selection input can involve two inputs to first specify a set of points along an axis normal to the surface of the display, followed by the rendering of another image from a different perspective in order to select a point along that axis. Regardless of how the image is rendered, a user can then provide a selection in step 302 which specifies the tracking point. In other words, the selection of the tracking point in step 302 can be provided on the selection image displayed in step 303. To this end, the interface displayed for selection can limit the potential locations in the image for selection to a registered portion of the locale by making only those portions available for selection. The registered portion of the locale could be the portion of the locale that is defined by the three-dimensional model such as the scene surfaces mentioned above.

Step 302 can involve receiving a selection of a tracking point. The step can be conducted with reference to the three-dimensional model. For example, if the three-dimensional model is a full three-dimensional texture mesh of an entire locale, the selection of the tracking point could involve selecting x, y, and z coordinates for a point in the locale in the coordinate frame of the model. As another example, if the three-dimensional model included a set of scene planes, the selection of the tracking point could be provided with reference to a scene plane or other registered surface in the locale or on the object. For example, the selection could be provided on a fiducial element in the form of a two-dimensional encoding that is temporarily located in the scene for the purposes of defining the registered surface, allowing selection of the point, and synthesizing training data. As another example, the selection could be on a table surface which was registered using a temporary tag placed on the table. The selection could be provided in many ways such as by selecting a scene plane (if more than one was available) and selecting x and y coordinates for a point in the scene plane with reference to the model's origin for that scene plane. As another example, the selection could be provided with reference to a scene plane or other registered surface in the locale or on an object, with an offset to specify a point floating in space relative to the physical composition of the locale or object. In other words, the tracking point could be floating relative to the registered surface. The offset could be used to specify a point located at a distance from the registered surface in a direction perpendicular to the scene plane. In another embodiment, the offset could be specified in the form of a vector indicating a distance and direction off the registered surface at which the tracking point was located. Step 302 can also be conducted with reference to a plane or shape in the locale that has been segmented or delineated via a separate image processing algorithm or by hand to produce a miniature three-dimensional model capable of receiving tracking point selections. In short, the step that precedes step 302 in order to form a potential point for selection include the generation of any three-dimensional data structure regarding the locale or object.

The execution of step 302 can also involve the algorithmic extension of potential tracking points offered by the three-dimensional data structure. For example, the selection can also be conducted through the assistance of an algorithm that performs sub-pixel selections such as a sub-pixel Harris corner detector or other computer vision processing algorithm that extrapolates a sub-pixel selection from a coarse selection. As another example, selection points on the three-dimensional data structure can be expanded by searching for trackable texture features that are adjacent to registered scene surfaces relative to the original three-dimensional data structure to allow for selection of the additional points. The expansion algorithms used for this purpose can be optimized to expand to additional points that would be conducive for tracking using trained networks due to their unique texture patterns or their information content relative to the surrounding region of the locale or object.

Furthermore, as stated previously, the selection in step 302 does not need to be conducted relative to the same three-dimensional data structure used for synthesizing training data as in FIG. 3. However, although the selection does not need to be provided with respect to the model, both providing the selection with reference to the model in step 302 and synthesizing training data 304 using the model exhibit certain benefits in that the tracked point that the network is specified to identify will be pre-registered in the system generating training data to teach the network how to identify that specific point.

Regardless of how the tracked point is selected, flow chart 300 will continue with step 305 of defining an output node in an output layer of the network as a first point tracking node associated with the tracking point. The execution of step 305 can also include automatically altering the size of the output layer of the network to accommodate additional tracking points, though the size of the output layer might not change and unused track point outputs can be ignored. The execution of step 305 can also include altering the number of hidden layers in the network or adding additional nodes to pre-existing layers. Subsequently, a training procedure will be conducted to adjust the internal weights of the network such that the first point tracking node identifies the tracked point in any image applied to the input of the network. The training procedure can include steps 306, 307, and 308 conducted in an iterative fashion. The training procedure can use data synthesized in step 304. As mentioned, step 304 could potentially use a three-dimensional model of the scene or object to generate the training data.

In specific embodiments of the invention, the network can be trained to function without fiducial elements, or with fiducial elements occluded. To this end, the fiducial elements can either be scrubbed entirely from the three-dimensional model before training data is synthesized, or the training data can be synthesized with the fiducial elements randomly occluded to assure that the network learns to rely on alternative portions of the locale or object and does not become too dependent on the fiducial elements. If this step is not conducted, the network runs the risk of relying too heavily on the fiducial elements because in many cases they are specifically designed to be obtrusive elements with strong signals specifically for this purpose. With the fiducial elements removed or occluded, the tracked points can still be located in the same location that was previously occupied by the tag or defined with respect to the prior location of the tag, but the tag will no longer be at that location. In specific approaches, the fiducial elements, such as the anchor fiducial elements in U.S. patent application Ser. No. 16/412,825 could be kept in the model but be occasionally occluded in the training data. The point tracking network could therefore learn to function to track points in run time images even if fiducial elements that it might otherwise have relied on are temporarily occluded. Of course, as stated previously, the networks disclosed herein can learn to track points even if the locale or object is completely devoid of any fiducial elements.

Fiducial elements can be removed from the training process in various ways. First, the elements can by physically removed from the locale or object after the three-dimensional model has been used to specify a tracking point and a fresh three-dimensional model of the locale or object can be captured for purposes of synthesizing training data for the network. In these embodiments, the two three-dimensional models can be registered with each other in order for the proper training data to be generated for the defined tracked point. In another example, the fiducial elements can be removed algorithmically or by hand by modifying the texture, or depth information as needed, of the three-dimensional model before it is used to synthesizing training data. In a specific example of this form of approach, a generative adversarial network (GAN) can be used to fill in the regions of the three-dimensional model occupied by the fiducial element with surrounding texture. The GAN can be used not only to modify the three-dimensional model but can also be part of the training data synthesis step in that the fill can be different from training image to training image. Using these approaches the network must learn to concentrate on other things in the scene rather than the fiducial elements when learning tracking points. The network can thereby learn points in space and does not need the tracking points to align with any actual point in the locale or on the object. Instead the networks just need enough context, such as walls or textures, in the scene to infer the location of a tracked point.

Flow chart 300 includes step 304 of synthesizing training data. This step can include synthesizing a training image and the supervisor tracking point location using the three-dimensional model. The supervisor tracking point location can be a location in the training image where the tracking point is located. FIG. 3 includes three pairs of training data generated in this fashion: 310, 311, and 312. Each of these pairs of training data include a training image of the locale from FIG. 2 and a set of x and y coordinates corresponding to the location of the tracking point in the image. The coordinates will all identify the same point in the locale but will have different values in order to identify it in each of the different images.

In specific embodiments of the invention, a three-dimensional model will be used to generate the supervisor tracking points, but not the training images. Instead, the three-dimensional model will be registered with the scene when it is captured by an imager, such as via a fiducial element that is temporarily in the scene as the training images are captured. The registered three-dimensional model can then be used to back project the supervisor tracking points into the two-dimensional images captured by the imager. In specific embodiments, the supervisor tracking points can be a maximum number of points for which point tracking can still be conducted in real time given a computational resource budget as described above (e.g., 500 points evenly spaced in a locale). The large number of points will provide a large number of training examples for each training image.

In specific embodiments of the invention, different types of variation can be introduced to increase the efficacy of the training set. The training images can be generated using the model by rendering a view of the locale or object. The training set can include a broad array of rotations around the center point of the locale or object and various modifications of the imager pose. In specific embodiments in which the network is expected to function in an application that does not continuously target the approximate center point of the locale or subject, an even greater variation of training data should be generated that includes views that approximate variations around the expected run time pose of the camera. The training images can also be modified in terms of lighting, shadow, or noise in order to create variation and assure a robust training set for the network. The training images can also be synthesized via compositing of occlusions into the images to occlude any fiducial elements that remain in the locale or object and also occlude the tracking point itself. The occlusions can be random geometric shapes or shapes that are likely to occlude the tracking point or fiducials at run time. For example, a cheering crowd in the case of a stage performance locale, sports players in the case of a sports field locale, or actors on a set in a live stage performance. The supervisor tracking point in these situations can also include a supervisor occlusion indicator such that the network can learn to track the point even when it is occluded by people and props that are introduced in and around the tracked point and end up occluding parts of the set that the network might otherwise have learned to exclusively focus on for identifying a point. In a similar way, the training data can include images in which an object is self-occluded (e.g., the view of the imager is from the back side of an object and the tracking point is on the front). The network can be designed to throw a separate self-occlusion flag to indicate this occurrence. As such, the step of synthesizing training data can include synthesizing a self-occlusion supervisor so the network can learn to determine when a tracked object has self-occluded the tracking point.

Figure 4:
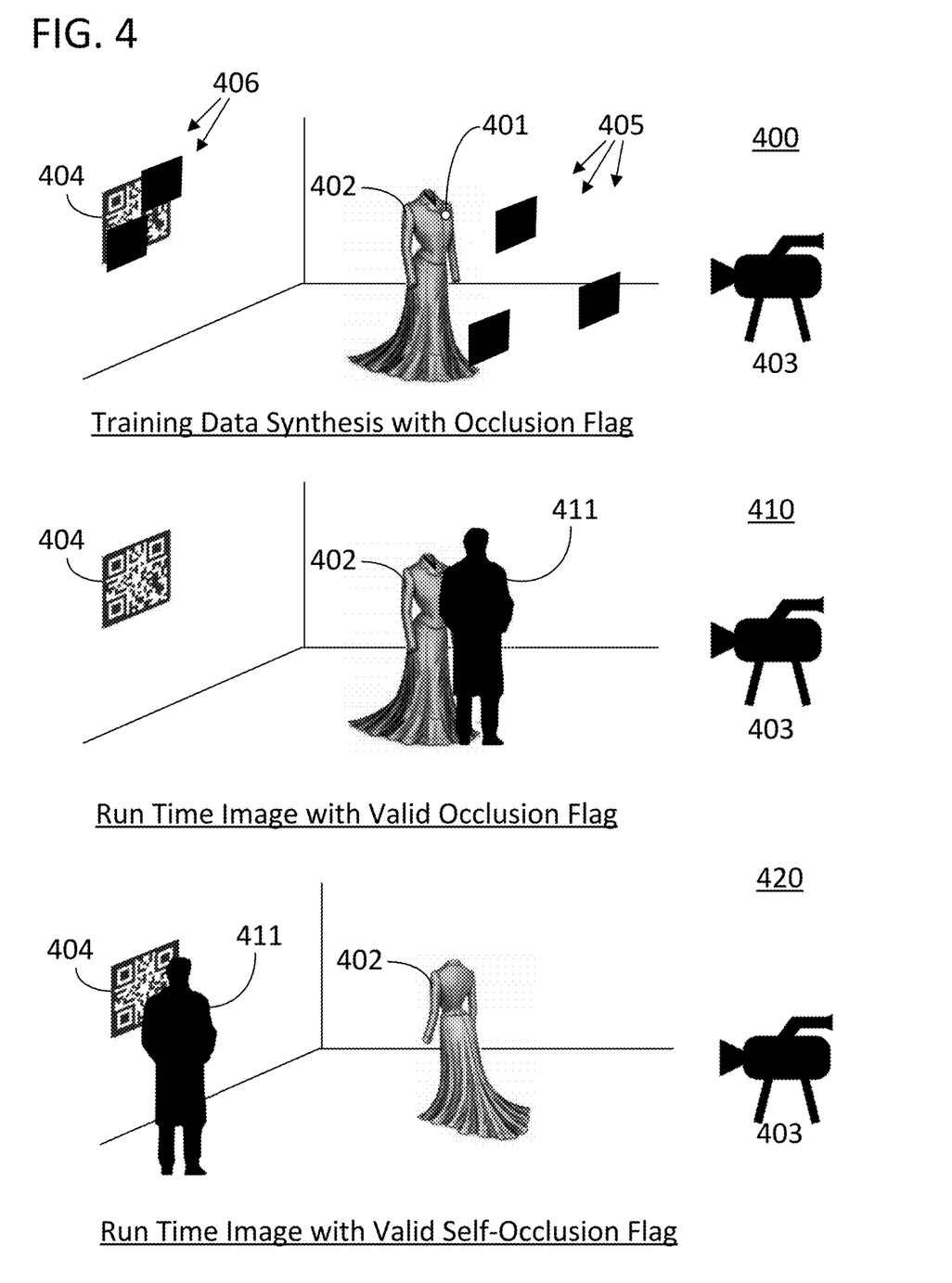
FIG. 4 is an illustration of a locale on which a network is trained to function to identify a tracking point despite the introduction of occlusions over the tracking point and fiducial elements, as well as self-occlusions of an object in accordance with specific embodiments of the invention disclosed herein.

FIG. 4 illustrates how training data can be synthesized for step 304 in order to properly train a network to perform in an environment with potential occlusion events. The figure is broken into three sections: 400, 410, and 420. Section 400 illustrates an example of training data generation and sections 410 and 420 illustrate run time images upon which the network will be able to conduct point tracking if properly trained. The training data in section 400 is illustrated in three-dimensional perspective to illustrate the associated concepts. However, the actual synthesis of training data will generally involve the introduction of occlusions to a two-dimensional image by compositing an occlusion over the tracking point and/or other elements in the locale or on the object directly on the image. Section 400 shows a subject 402 in a locale captured from the perspective indicated by imager 403. The tracking point 401 is located on subject 402. The training image in this situation is augmented through the introduction of a set of occlusions 405 that occlude the tracking point from view and a set of occlusions that partially occlude fiducial element 404. The according supervisor for the training data set would include the location of tracking point 401 in the image captured from the perspective of imager 403 and an occlusion flag. Variations of the positions of the occlusion set 405 and 406 could be applied to the image and many other synthesized images in order to train the network not to rely too heavily on fiducial elements such as element 404 and features in proximity to tracking point 401. Furthermore, the network will be able to report if the tracking point is occluded.

Section 410 illustrates the capture of a run time image in which a network trained in accordance with specific embodiments of this disclosure would be able to perform and validly throw an occlusion flag on the output of the network. In section 410, an additional subject 411 has entered the locale and occludes tracking point 401 from the view of imager 403. Accordingly, the network, in response to an image generated of section 410 from imager 403, would produce an estimate of the location of tracking point 401 and/or an occlusion flag for the tracking point.

Section 420 illustrates the capture of a second run time image in which a network trained in accordance with specific embodiments of this disclosure would be able to perform and validly throw a self-occlusion flag on the output of the network. In section 420, the additional subject 411 now occludes fiducial element 404. Furthermore, subject 402 has altered orientation and tracked point 401 is on the backside of subject 402 relative to imager 403. Accordingly, the network, in response to an image generated of section 420 from imager 403, would produce an estimate of the location of tracking point 401 and/or a self-occlusion flag for the tracking point. This would be done despite the fact that fiducial element 404 has been occluded by subject 411 because the network had been trained not to rely too heavily on fiducial elements, if at all, via the introduction of composited data such as occlusions 406.

Returning to FIG. 3, the training data synthesized in step 304 can be used in a training routine including applying the data to the network in step 306, generating an inference 314 in response to the data in step 307, and updating the weights of the network based on a delta 313 between the inference 314 generated in step 307 and the supervisor for the input image 312 generated in step 304. The delta 313 is illustrated in simplified form in the figure. In actual application the delta will generally include a more complicated loss function such as those used in common network training routines. Indeed, the inference itself can include more information than just the coordinates of the image in order to provide more information regarding the state of the network and allow for better guidance of the updating conducted in step 308. For example, the inference can include probabilities for a set of other potential locations for the tracking point along with coordinates for those locations. As another example, a probability could be provided for numerous fixed locations in the image where the probability is the probability that the tracking point is located at those fixed location. In another case in which the output is a larger data structure, the fixed locations could include every pixel in the image, and even sub-pixel locations by dividing each pixel into sectors and providing a probability for every sector. Furthermore, the inference could be a set of such matrixes where one matrix of probabilities etc. was generated for each tracking point being tracked by the network.

In specific embodiments of the invention, step 306 can include applying to an input layer of the directed graph: (i) an encoding of a training image of the locale; and (ii) a supervisor tracking point location on the training image. The supervisor tracking point location being the location of the tracking point on the training image. Both the supervisor tracking point location and the training image can be generated in accordance with step 304 above. Step 307 could then include generating, in response to the applying of the training image, a tracking point inference at the output node of the directed graph using a set of internal weights of the directed graph. Step 308 could then include updating the set of internal weights based on a delta between the tracking point inference and the supervisor tracking point location. In specific embodiments of the invention, the execution of steps 306-308 could also include the application of a second training image to the network with an occluded tracked point, and the execution of steps 307 and 308 with a supervisor occlusion indicator indicating that the tracking point is occluded in the second training image. Specifically, the execution of step 308 could include updating the set of internal weights based on a delta between an occlusion flag in the second tracking point inference and the supervisor occlusion indicator. In other words, if the network did not properly identify the tracking point as occluded, the weights would be updated more dramatically than if it had.

Figure 5:
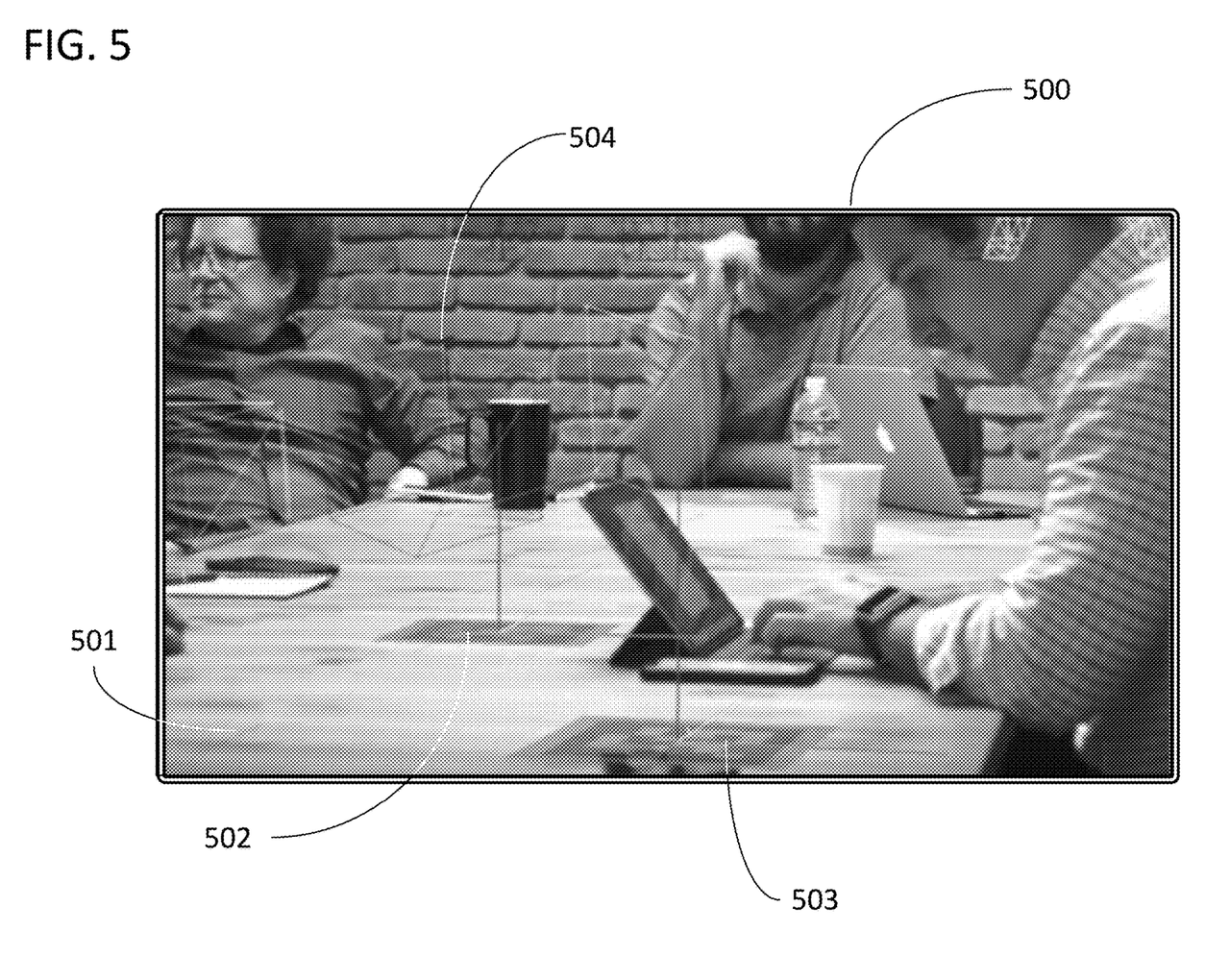
FIG. 5 is a photograph of a locale that has been augmented to include the location of a tracking point location identified by a network trained in accordance with specific embodiments of the invention disclosed herein.

FIG. 5 is an actual scene image 500 produced using a network trained using an implementation of the flow chart of sections of FIG. 3. The image includes a locale in which a scene surface 501, in the form of a table, was registered using temporary fiducial elements 502 and 503. The temporary fiducial elements have been removed from the locale prior to the capture of the scene image 500 and have been added back in to this image virtually for illustration purposes. However, before they were removed, the temporary fiducial elements were used to register table 501 for purposes of specifying a tracked point 504 located above the surface of the table. The network was then trained to identify tracked point 504 in any image taken of the locale using training data that did not include temporary fiducial elements 502 and 503. As a result, when scene image 500 was captured, without fiducial elements 502 and 503, the network was still able to identify tracked point 504 in the image. Multiple such tracking points, all identified by the same network, were then used to render three dimensional boxes floating in air above the table.

The Present application as well as the disclosures of U.S. patent application Ser. No. 16/412,784 and U.S. patent application Ser. No. 16/412,825 each provide methods for the innocuous tracking of points in a scene image. These points can be provided in the virtual fiducial elements of U.S. patent application Ser. No. 16/412,825, the registered natural fiducial elements of U.S. patent application Ser. No. 16/412,784, and the arbitrary tracked points identifiable by the networks disclosed in the Present application. The disclosure of U.S. patent application Ser. No. 16/412,784, filed concurrently herewith, which is incorporated by reference here in its entirety for all purposes, provides a method for rapidly detecting fiducial elements in an image. Any of these methods can be used in combination with an approach for providing continuous real time calibration for a camera with a view of a locale or object that has been augmented with any of these points. The combined approach allows for the innocuous calibration of an imager in any environment. The calibration can also be conducted in real time and therefore does not depend on post processing modification of captured images.

Calibration in accordance with this disclosure, and for the purposes of rendering, can require knowledge of the intrinsic calibration (focal length, center of projection, distortion) and also the zoom and aperture of the camera. In situations in which a multiple camera rig is used, calibration also requires the extrinsic relation of one camera in a scene as another camera changes its focus, zoom, and aperture. The one camera can be a hero camera and the other cameras can be an auxiliary witness camera.

Some high-end cameras report their settings digitally but the reporting is not generally accurate enough or often enough due to limited export ability. One solution is to calibrate a camera that reports its setting digitally for a range of each setting, create tables of these settings, and interpolate between them as necessary. The interpolation can be done by a separate system and in real time. However, this option is tedious and is not available for cameras that don't report their settings digitally, and many cameras do not report this data at all.

In specific embodiments of the invention, a solution to the problem of achieving real time accurate camera calibration is to use any of the options provided above. For example, in terms of point tracking via fiducials or customized networks, it is possible to back project from points found in captured images into a three-dimensional data structure of the locale or object using different calibration values and continually, such as in each frame, solve for the calibration parameters and pose of the imager. In specific embodiments of the invention, the tracked points will have sub-pixel accuracy using an algorithm such as Harris Corner detection to increase the accuracy of the solver. In these embodiments, an occlusion flag can be useful because the visual features cannot be found and so should not be used in that frame's calibration parameter fit.

Figure 6:
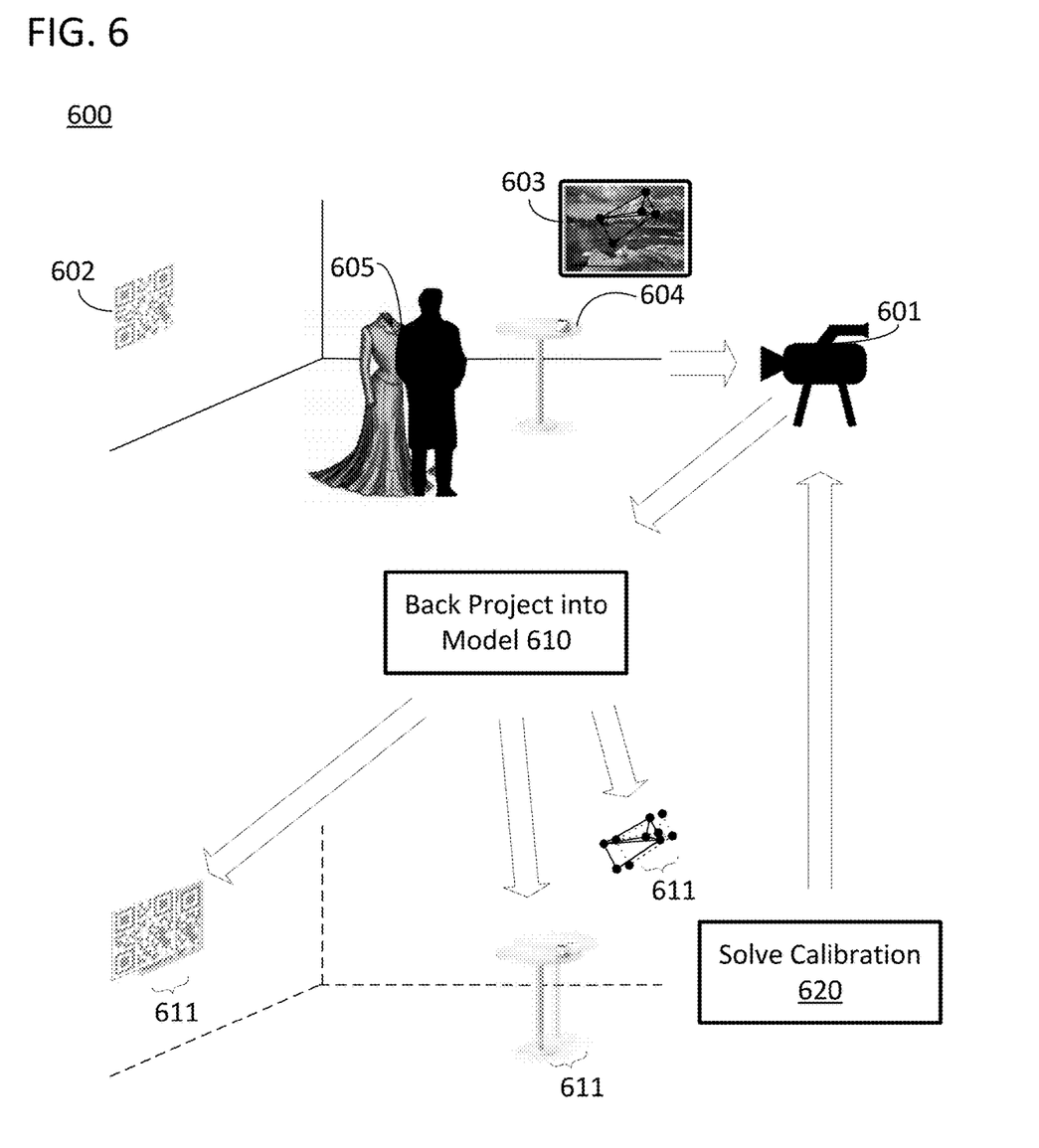
FIG. 6 is data flow diagram illustrating the operation of a camera calibration method using fiducial elements or point tracking networks in accordance with specific embodiments of the invention disclosed herein.

FIG. 6 provides a data flow diagram 600 illustrating a method for camera calibration that is in accordance with specific embodiments of the invention disclosed herein. Data flow diagram 600 includes an imager 601 capturing an image of a locale with a virtual fiducial element 602, a registered natural fiducial element 603, a registered natural fiducial object 604, and a tracked point 605. The various forms of fiducial elements would not likely all be used in combination, but they are provided for illustrative purposes. As stated previously, the tracked points could be a large number (e.g., 500) evenly distributed points in the locale. Notably, tracked point 605 is occluded from the imager's perspective. Accordingly, an occlusion flag could indicate to the calibration system that point 605 should be ignored in the calibration routine.

After imager 601 has captured an image of the locale, the tracked points in the fiducials as obtained by the imager, or generated by the network operating on the image, could be used in a step 610 to back project into a model of those points and their relative three-dimensional positions. The resulting offset 611 would be the result of the camera's non-ideal intrinsic and extrinsic calibration. Accordingly, in an iterative loop provided by feedback step 620, the calibration parameters of the camera could be modified to produce updated locations for the points to be back projected into the model. The loop could then iterate until the offset was zero and the cameras calibration was solved for. With enough points, the process could be conducted with high accuracy and in real time. Using the approaches disclosed above calibration could also be conducted without the inclusion of fiducial elements in the scene during the capture of a scene image. The loop could be controlled by a cost function minimization routine in which the cost function was a difference between the position of the points as detected from the image, and modified by a perturbation in the camera calibration, and the position of the point as expected from a three-dimensional model of the location of the point relative to other tracked points or fiducials.

While the specification has been described in detail with respect to specific embodiments of the invention, it will be appreciated that those skilled in the art, upon attaining an understanding of the foregoing, may readily conceive of alterations to, variations of, and equivalents to these embodiments. While the example of a visible light camera was used throughout this disclosure to describe how a frame is captured, any sensor can function in its place to capture a frame including depth sensors without any visible light capture in accordance with specific embodiments of the invention. While language associated with ANNs was used throughout this disclosure any trainable function approximator can be used in place of the disclosed networks including support vector machines, and other function approximators known in the art. Any of the method steps discussed above, with the exception of the physically removing and placing fiducial elements in a locale or on an object, can be conducted by a processor operating with a computer-readable non-transitory medium storing instructions for those method steps. The computer-readable medium may be memory within a personal user device or a network accessible memory. Modifications and variations to the present invention may be practiced by those skilled in the art, without departing from the scope of the present invention, which is more particularly set forth in the appended claims.

What is claimed is:

1. A computer-implemented method for training a network for point tracking, comprising:
    generating a three-dimensional model of at least a portion of a locale;
    receiving a selection of a tracking point with reference to the three-dimensional model;
    defining an output node in an output layer of the network as a first point tracking node associated with the tracking point;
    applying to an input layer of the network: (i) an encoding of a training image of the locale; and (ii) a supervisor tracking point location on the training image, the supervisor tracking point location being a location of the tracking point on the training image;
    generating, in response to the applying of the training image, a tracking point inference at the output node of the network using a set of internal weights of the network; and
    updating the set of internal weights based on a delta between the tracking point inference and the supervisor tracking point location.

2. The method of claim 1, further comprising:
    synthesizing the training image and the supervisor tracking point location using the three-dimensional model.

3. The method of claim 1, further comprising:
    applying to the input layer of the network: (i) an encoding of a second training image of the locale; and (ii) a supervisor occlusion indicator for the second training image, the supervisor occlusion indicator indicating that the tracking point is occluded in the second training image;
    generating, in response to the applying of the second training image, a second tracking point inference at the output node of the network using the set of internal weights of the network; and
    updating the set of internal weights based on a delta between an occlusion flag in the second tracking point inference and the supervisor occlusion indicator.

4. The method of claim 3, further comprising:
    synthesizing the second training image and the supervisor occlusion indicator using the three-dimensional model;
    wherein synthesizing the second training image includes compositing an occlusion over the tracking point in the image.

5. The method of claim 1, further comprising:
    placing a set of fiducial elements in the locale;
    wherein the three-dimensional model is generated and registered using the set of fiducial elements.

6. The method of claim 5, wherein:
    the selection of the tracking point is provided with reference to a registered surface;
    the tracking point is floating relative to the registered surface.

7. The method of claim 5, wherein:
    the selection of the tracking point is provided with reference to a registered surface;
    the tracking point is on the registered surface; and
    the set of fiducial elements is a two-dimensional encoding that defines the registered surface.

8. The method of claim 5, further comprising:
    displaying a selection image on a display;
    wherein the selection image is of the locale;
    wherein the selection of the tracking point is provided on the selection image.

9. The method of claim 8, wherein:
    a registered portion of the locale is available for selection in the selection image; and
    the registered portion is the portion of the locale that is defined by the three-dimensional model.

10. The method of claim 1, wherein:
    the trained network includes a convolutional neural network;
    the set of internal weights are filter values of the convolutional neural network;
    the encoding of the training image includes at least one two-dimensional matrix of pixel values; and
    the supervisor tracking point location is a pixel location in the at least one two-dimensional matrix of pixel values.

11. A trained network, stored in a non-transitory computer readable medium, for point tracking comprising:
    an input layer configured to receive an encoding of an image of a locale;
    a set of internal weights which encode information associated with: (i) the locale; and (ii) a tracked point in the locale;

an output layer having a set of output nodes and configured to provide an output based on: (i) the image as received at the input layer; and (ii) the set of internal weights; and
a first point tracking node in the output layer that tracks the tracked point in the image.

12. The trained network of claim 11, wherein:
the tracked point is defined in a three-dimensional model of at least a portion of the locale; and
the set of internal weights encode information associated with the locale because they encode information associated with the three-dimensional model.

13. The trained network of claim 11, wherein:
the trained network includes a convolutional neural network;
the set of internal weights are filter values of the convolutional neural network;
the encoding of the image includes at least one two-dimensional matrix of pixel values;
the first point tracking node tracks the tracked point in the image by identifying a pixel location in the at least one two-dimensional matrix of pixel values; and
the output is the pixel location in the at least one two-dimensional matrix of pixel values.

14. The trained network of claim 11, further comprising:
a second point tracking node in the output layer;
wherein the set of internal weights encode information associated with a second tracked point in the locale; and
wherein the second point tracking node tracks the second tracked point in the image.

15. The trained network of claim 11, wherein:
the first point tracking node generates a set of x and y coordinates for the tracked point; and
the set of x and y coordinates are provided with reference to the image.

16. The trained network of claim 11, wherein:
the first point tracking node generates an occlusion flag if the tracked point is occluded in the image.

17. The trained network of claim 11, wherein:
the tracked point is associated with an object in the locale;
the set of internal weights encode information associated with the object; and
the first point tracking node generates a self-occluding flag if the tracked point is occluded in the image by the object.

\* \* \* \* \*